United States Patent [19]

Persson

[11] 4,120,439
[45] Oct. 17, 1978

[54] METHOD FOR WELDING BY EXPLOSION OF POWDER MATERIAL ON A FIRM SURFACE

[75] Inventor: Per Ingemar Persson, Nora, Sweden
[73] Assignee: Nitro Nobel AB, Gyttorp, Sweden
[21] Appl. No.: 810,086
[22] Filed: Jun. 27, 1977

[30] Foreign Application Priority Data

Jul. 6, 1976 [SE] Sweden .............................. 7607713

[51] Int. Cl.² ........................................... B23K 21/00
[52] U.S. Cl. .................................. 228/107; 29/421 E
[58] Field of Search ..................... 228/107; 29/421 E

[56] References Cited

U.S. PATENT DOCUMENTS

| | | | |
|---|---|---|---|
| 3,160,952 | 12/1964 | Corney | 228/107 X |
| 3,346,946 | 10/1967 | Riegelmayer | 228/107 |
| 3,371,404 | 3/1968 | Lemelson | 228/107 |
| 3,377,693 | 4/1968 | Fukumoto | 29/421 E |
| 3,380,908 | 4/1968 | Ono | 29/421 E X |
| 3,434,197 | 3/1969 | Davenport | 29/421 E X |

*Primary Examiner*—Donald G. Kelly
*Attorney, Agent, or Firm*—Hane, Roberts, Spiecens & Cohen

[57] ABSTRACT

A method of bonding powdered material to a surface comprising placing at least one layer of powdered material onto a support of ductile material, positioning a surface to be coated by the powdered material in facing spaced relation with the powdered material and placing an explosive charge on the support on the surface thereof opposite the powdered material. The explosive charge is then detonated to produce acceleration of the support and the powdered material thereon towards the surface to be coated to cause impact of the powdered material with the surface to be coated and welding thereof. The detonation of the explosive charge proceeds along the length of the charge to progressively bring the powdered material into impact contact with the surface to be coated. The speed of detonation of the explosive charge is less than the speed of sound in the powdered material or support.

7 Claims, 7 Drawing Figures

METHOD FOR WELDING BY EXPLOSION OF POWDER MATERIAL ON A FIRM SURFACE

FIELD OF THE INVENTION

The invention relates to methods of welding powder material on a substrate surface by explosion welding.

BACKGROUND

The method of joining plates of different metallic materials by means of welding by explosion is well known, and the method is applied on a productive scale. However, in this connection one is limited to the use of ductile materials (elongation at rupture larger than 8%).

BRIEF SUMMARY OF THE INVENTION

The present invention seeks to enable plating by means even of brittle materials, which can be inorganic or organic, such as carbides, nitrides, boron, sulphides, oxides, etc. on ductile materials such as copper, brass, steel, titanium, aluminium, nickel, etc.

In accordance with the invention there is provided a method of welding powdered material to a surface comprising placing at least one layer of powdered material onto a support of ductile material, positioning a surface to be coated by the powdered material in facing spaced relation with said powdered material, placing an explosive charge on the support on the surface thereof opposite the powdered material, and detonating the explosive charge to produce acceleration of the support and the powdered material thereon towards the surface to be coated to cause impact of the powdered material with the surface to be coated, the detonation of the explosive charge proceeding along the length of the charge to progressively bring the powdered material into impact contact with the surface to be coated, the speed of detonation of the explosive charge being less than the speed of sound in the powdered material or support.

DETAILED DESCRIPTION

Figure 1:
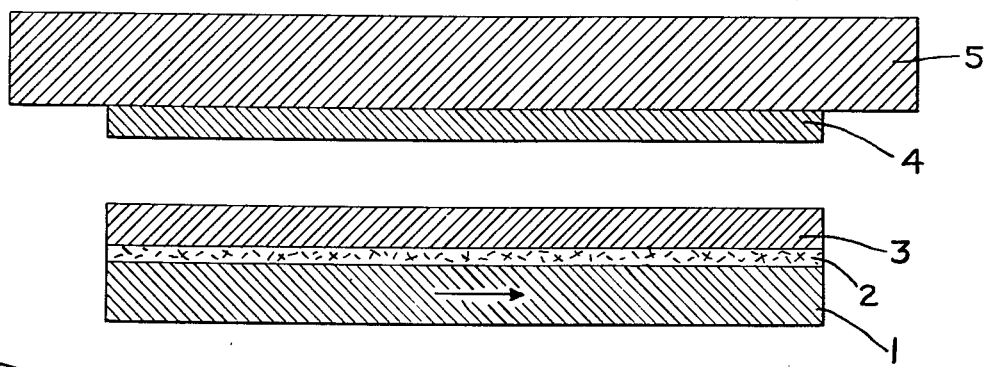
FIG. 1 is a side sectional view showing the arrangement for carrying out explosive welding according to the invention, the direction of propagation of the explosive being shown by the arrow.
Figure 2:
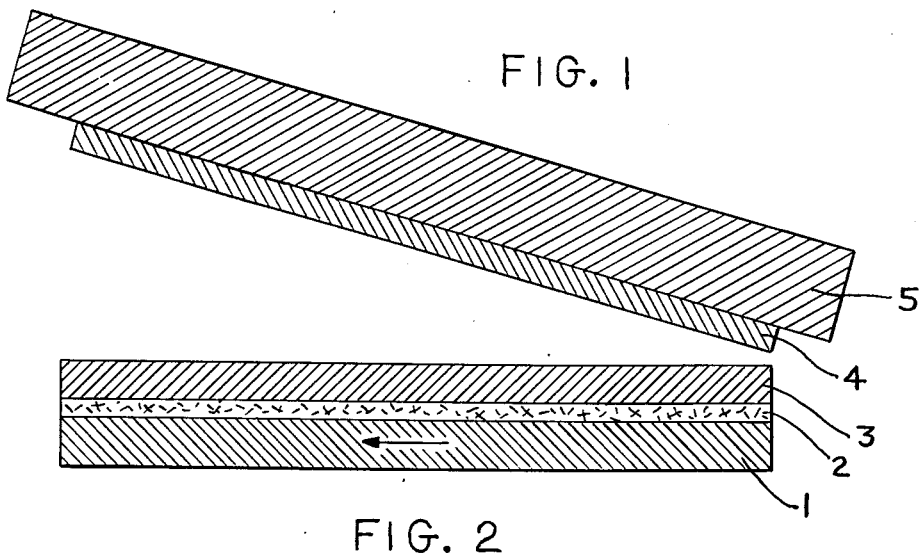
FIG. 2 shows a modification of the arrangement in FIG. 1.

FIG. 1 shows schematically a typical arrangement according to the invention. Numeral 1 designates an explosive charge, 2 is a plate which supports the powdered plating material 3, and numeral 4 is plate whose lower surface is to be plated. The plate 4 is supported on a support 5 of substantial rigidity and mass. It is a prerequisite for the applicability of the method that the speed of detonation of the explosive does not exceed the velocity of sound in the compressed powder layer or the base material, and it should preferably be between 1,800 m/s and 3,000 m/s. Additionally, the draw waves reflected from the blast wave created are going to tear the workpiece. This applies for the parallel arrangement shown according to FIG. 1. As is also the case for the welding of plates by explosion, the speed of detonation for the explosive can of course be higher, if desired, if the arrangement is at a static angle (according to FIG. 2).

Figure 3:
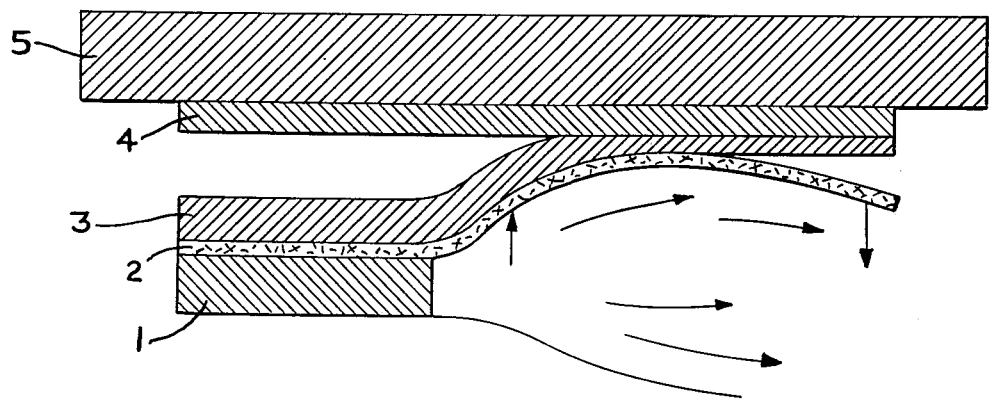
FIG. 3 shows the arrangement in FIG. 1 in the course of detonation.
Figure 4:
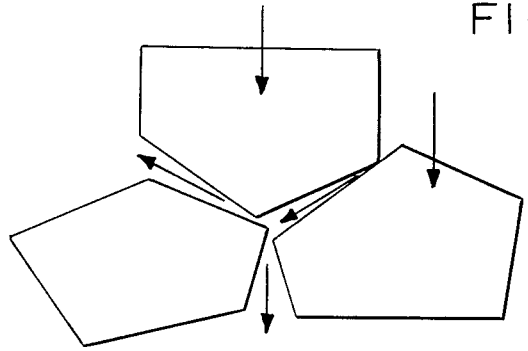
FIG. 4 shows the manner of welding of individual particles of the powder material.

The supporting plate 2 consists of a ductile and durable material, but it is not required to be made of metal, and it can be made of plastic, wood or the like. With the detonation of the charge, the supporting plate 2 together with the layer of powder 3 are accelerated and they will collide with the base material 4 (FIG. 3). In FIG. 3 it is to be seen that detonation of the explosive takes place in a direction parallel to the powder layer 3 and perpendicular to the direction of travel of the layer 3 and base 2 towards base material 14. The layer 3 and base 2 are progressively displaced towards base material 4 in accordance with the advance of the detonation wave front as evident from FIG. 3. In the same way as by welding by explosion of plates, the surface grains of the layer of powder are going to be joined with the base material. Further, the layer of powder is going to be compressed by means of the kinetic energy remaining in the supporting plate, as the the layer of powder impacts against the base material. A welding by explosion takes place between the individual grains through their collision with each other as seen in FIG. 4.

The draw wave reflected from the back of the base material will give the supporting plate a movement in the opposite direction after it has been compacted, and thus it is ejected. In certain cases, e.g. when the supporting plate is made of metal of low hardness, there is no ejection, and it will then be necessary to separate the supporting plate from the workpiece by means of mechanical or chemical methods. The distance of acceleration, i.e. the distance between the top surface of the layer of powder and the base material in FIGS. 1, 2, and 3 before the explosion, depends upon the weight of the layer of powder per unit of area and the quantity of charge per unit of area, as well as upon the type of explosive and weight per unit of area for the supporting plate 2. The application of the method is not restricted to any upper or lower limit in this respect, but it is generally between 2 mm and 50 mm. The method can be applied both in normal and in rarefied atmosphere as well as in various types of gaseous atmospheres. By means of explosion, for instance, in an argon atmosphere a considerable increase in temperature can be obtained in conjunction with the compaction of the powder due to the ionization of the gas in connection with the passage of the blast wave.

For an explosion with a high starting temperature, it is often necessary to use evacuation or an inert gas (e.g. helium) in order to prevent oxidation or other nondesirable processes.

Figure 5:
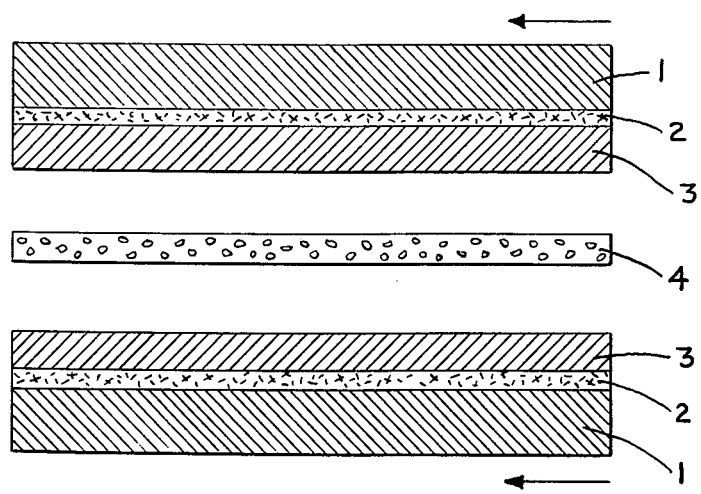
FIG. 5 shows a modification in which both sides of a plate are to be coated.
Figure 6:
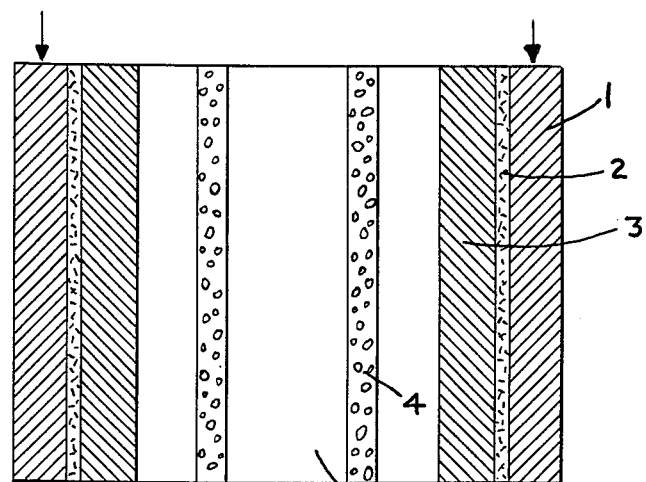
FIG. 6 shows a modification for coating the external surface of a cylindrical plate.
Figure 7:
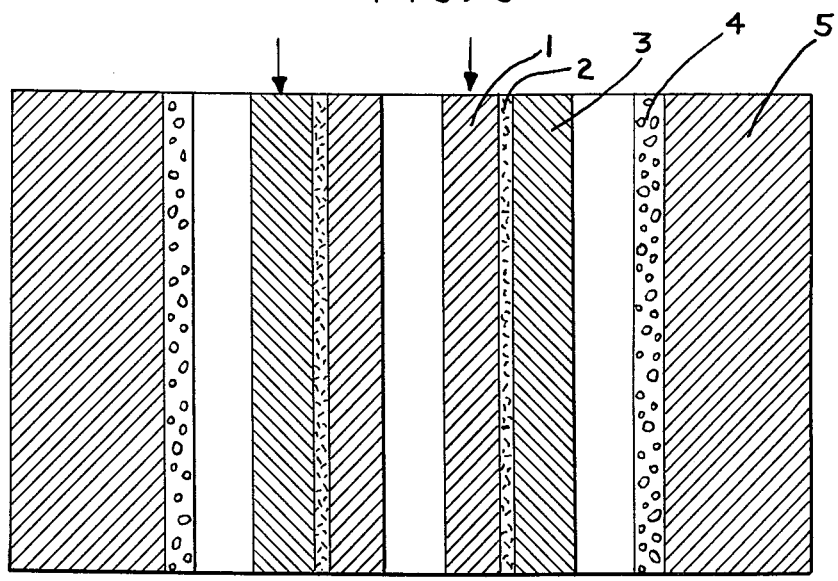
FIG. 7 shows a further modification for coating the inside surface of a cylindrical plate.

FIG. 5 shows a variation of the method, in which a simultaneous plating is obtained on both sides of the base material. The top layer of powder will then have to be kept in place prior to the explosion, for instance, by a net of metal wire, preferably made of the same material as the base material. The method is not restricted to plane workpieces and FIGS. 6 and 7 show examples of cylindrical arrangements, with external and internal plating respectively. The base material in FIG. 6 can of course be a homogeneous bar, and in that case there will be no core 5.

It is obvious that the powder material can consist of several layers of different types, so that a multi-layer plating is obtained. The layer of powder can consist of a mixture of various materials and additionally reinforcements in the shape of wires, netting, fibres, wickers or tapes of various materials can be inserted.

EXEMPLIFIED DESCRIPTION OF PREFERRED EMBODIMENTS

Example 1

In the arrangement in FIG. 1 the base material is a copper plate with dimensions 200 × 500 × 3 mm, and the supporting plate is a steel plate of about 250 × 250 × 50 mm.

The charge was a 20 mm thick mixture of ammonium nitrate and oil with a speed of detonation of 2,700 m/sec.

The supporting plate was 2 mm steel and the layer of powder consisted of tungsten carbide of a thickness of 5 mm. The distance for acceleration was 15 mm. After the explosion a plating of about 2 mm in thickness was obtained on the copper plate.

Example 2

An arrangement according to FIG. 5 was made with a 3 mm thick plate of titanium as the base material. The other dimensions were as in Example 1. The plating material was crushed melt magnetite.

After the explosion, a plating of about 1 mm in thickness was obtained on both sides of the titanium plate.

Example 3

The same arrangement and dimensions were used as in Example 1, but a base plate made of carbon steel and a plating layer consisting of crushed cemented carbide were used. A firm layer of about 2 mm in thickness was obtained on one side of the steel plate. Bits of the material were sharpened and used with fine result as cutting edges in connection with the turning of steel.

Example 4

An arrangement was provided in accordance with FIG. 1, and the dimensions were in accordance with Example 1, in addition to the following: base material 10 mm aluminium, plating material 5 mm layer of zirconium oxide, distance of acceleration 2 mm, explosive 10 mm layer of 60% PETN and 40% sodium chloride — speed of detonation 3,000 m/sec. A 1 mm firm plating layer of zirconium oxide was obtained on the base material.

Example 5

The arrangement in accordance with FIG. 6 was used.

The base material was a 5 mm thick steel tube of a length of 300 mm with an outside diameter of 50 mm and with an inside filling consisting of concrete as a core. The plating material was high-speed steel powder, 5 mm thick, fitted on the outside with a supporting tube of 2 mm carbon steel. The inner jacket of the plating material is supported by a fine-meshed iron wire netting with an inside diameter of 60 mm. The charging tube of a thickness of 18 mm, enclosed in a cardboard tube, consisted of trinitrotoluene ammonium nitrate and sodium chloride with a speed of detonation of 2,700 m/sec.

The charging tube was initiated uniformly on one of the entire end surfaces, so that an axial detonation is obtained.

After the explosion, the supporting tube was removed by means of turning.

This resulted in a steel tube with an even and firm layer of high-speed steel of about 2.0 mm in thickness.

Example 6

An arrangement was provided according to FIG. 7. A base metal tube with an inside diameter of 80 mm and a length of 200 mm, 10 mm thick of stainless steel, was embedded in reinforced concrete with a wall thickness of about 200 mm. The plating material was a 5 mm thick layer of aluminium oxide, supported at the outside by a fine-mesh stainless steel netting, and at the inside by a supporting tube made of 3 mm thick aluminium.

The charge was 12 mm ammonium nitrate/oil (speed of detonation 2,000 m/sec.), supported by both the supporting tube and by an inside cardboard tube. The charge was initiated uniformly on its entire end surface. After the explosion the concrete mould was smashed and the inside tube was turned out.

On the inside of the steel tube was a firm coat of aluminium oxide of about 1 mm in thickness.

What is claimed is:

1. A method of welding powdered material to a surface comprising placing at least one layer of powdered material onto a support of ductile material, positioning a surface to be coated by the powdered material in facing spaced relation with said powdered material, placing an explosive charge on the support on the surface thereof opposite the powdered material, and detonating the explosive charge to produce acceleration of the support and the powdered material thereon towards the surface to be coated to cause impact of the powdered material with the surface to be coated, the detonation of the explosive charge proceeding along the length of the charge to progressively bring the powdered material into impact contact with the surface to be coated, the speed of detonation of the explosive charge being less than the speed of sound in the powdered material or support.

2. A method as claimed in claim 1 wherein the direction of detonation of the explosive is at right angles relative to the direction of travel of the powdered material and support towards the surface to be coated.

3. A method as claimed in claim 2 wherein the wave front due to detonation travels parallel to the layer of powdered material.

4. A method as claimed in claim 1 wherein said powdered material is an organic material, an inorganic material, or mixtures thereof.

5. A method as claimed in claim 4 comprising adding reinforcements to said powdered material.

6. A method as claimed in claim 1 wherein the explosive is detonated in a gaseous atmosphere selected from the group consisting of air, helium, nitrogen, argon, hydrogen, and mixtures thereof.

7. A method as claimed in claim 1 wherein detonation is effected in a rarefied atmosphere.

* * * * *